United States Patent [19]

Dewenter et al.

[11] Patent Number: 4,742,536

[45] Date of Patent: May 3, 1988

[54] TELEPHONE MONITOR CIRCUIT AND METHOD

[75] Inventors: William G. Dewenter, Bellbrook, Ohio; Stephen D. Neale, Scottsdale, Ariz.

[73] Assignee: Energy Innovations, Inc., Dayton, Ohio

[21] Appl. No.: 922,874

[22] Filed: Oct. 24, 1986

[51] Int. Cl.$^4$ .......................................... H04M 11/00
[52] U.S. Cl. ...................................... 379/97; 379/382; 379/377
[58] Field of Search ....................... 379/93, 96, 97, 98, 379/92, 107, 377, 382, 383, 385

[56] References Cited

U.S. PATENT DOCUMENTS

| | | | |
|---|---|---|---|
| 4,284,849 | 8/1981 | Anderson et al. | 379/98 X |
| 4,304,970 | 12/1981 | Fahey et al. | 379/377 |
| 4,306,116 | 12/1981 | McClure et al. | 379/98 X |
| 4,378,470 | 3/1983 | Murto et al. | 379/97 |
| 4,410,766 | 10/1983 | Beirne | 379/377 |
| 4,412,292 | 10/1983 | Sedam et al. | |
| 4,429,185 | 1/1984 | Adrian et al. | 379/377 |
| 4,446,338 | 5/1984 | Rosch | 379/383 X |
| 4,455,453 | 6/1984 | Parasekuakos et al. | |
| 4,456,791 | 6/1984 | Forestier | 379/377 |
| 4,469,917 | 9/1984 | Shelley | 379/93 |
| 4,540,853 | 9/1985 | Albovy | 379/382 X |
| 4,596,021 | 6/1986 | Carter et al. | 379/98 |
| 4,639,553 | 1/1987 | Kiguchi | 379/377 |
| 4,656,318 | 4/1987 | Noyes | 379/98 X |
| 4,674,117 | 6/1987 | Burns | 379/377 |
| 4,686,700 | 8/1987 | Perry | 379/377 X |

Primary Examiner—Jin F. Ng
Assistant Examiner—Matthew E. Connors
Attorney, Agent, or Firm—Killworth, Gottman, Hagan & Schaeff

[57] ABSTRACT

A communication system is connected to a pair of telephone conductors which supply telephone service to a telephone subscriber. An optically coupled switch connects a first winding of a transformer across the telephone conductors. A second winding of the transformer is connected to a modem for communicating over the telephone conductors via the transformer. A voltage sensor circuit senses the voltage across the telephone conductors and detects a reduction in the voltage level across the conductors which indicates an off-hook condition of a telephone unit of the subscriber connected to the conductors. The voltage sensor circuit also detects the presence of a ring signal on the conductors. The switch is periodically opened so as to disconnect the transformer from the telephone conductors, and permit the voltage sensor circuit to check for an off-hook condition.

9 Claims, 2 Drawing Sheets

TELEPHONE MONITOR CIRCUIT AND METHOD

BACKGROUND OF THE INVENTION

The present invention relates to telephone communication systems and, more particularly, to a circuit for determining when a telephone unit of a telephone subscriber is in an off-hook condition.

Automated telephone communication systems for reporting information to a central location via existing telephone lines are well known. One such system is disclosed in U.S. Pat. No. 4,412,292, issued Oct. 25, 1983, to Sedam et al. The Sedam et al system monitors a soft drink vending machine and transmits data relating to the operation of the vending machine to a central computer at scheduled times. The system is connected to a telephone line which provides telephone service to the premises upon which the vending machine is located. The telephone communication system notifies the central computer upon occurrence of any of a number of alarm conditions, such as illegal entry, machine jamming, improper changer operation, sale of all items, loss of electrical power, and the like. Additionally, the system may call the central computer on a scheduled basis to provide inventory information.

In another type of automated telephone communication system, shown in U.S. Pat. No. 4,455,453, issued June 19, 1984, to Parasekvakos et al, a power meter is automatically read by circuitry located at the meter site. The communication system, also at the meter site, initiates a telephone call to a central computer at predetermined call-back times and transmits power consumption data.

Commonly, such an automated telephone communication system is not connected to a dedicated telephone line. Rather, a telephone line normally used for other purposes is accessed briefly by the system to report the data to the central computer. In the case of a system reporting a power meter reading, the communication system is connected to the power consumer's telephone line. A report from such an automated system may, for example, take less than a minute to transmit via a modem connected to the telephone line, and such a transmission can be scheduled for the early morning hours when other use of the telephone line is unlikely.

It will be appreciated that by connecting the automated telephone communication system to the telephone line of the subscriber rather than to a dedicated telephone line, significant cost savings are achieved. It will also be appreciated that should the telephone subscriber experience interference with his free use of his telephone, an automated telephone communication system is unlikely to gain his acceptance.

In the Parasekvacos et al system, the communication circuitry checks prior to a transmission to the central computer to see if any of the telephone units on the line are in an off-hook condition. Typically, the voltage across a pair of telephone conductors is approximately 48 volts DC when there are no telephone units across the conductors in an off-hook state. When a telephone handset of one of the units is taken off-hook, however, the unit then draws 80-180 m.a. and the voltage across the telephone conductors at the unit drops to less than 15 volts DC. The Parasekvacos et al circuit checks the voltage across the telephone conductors by means of an electronic circuit. A Zener diode in the circuit is connected across the telephone conductors to supply a gate signal to an SCR, turning the SCR on and initiating operation of the data transmission circuitry. If a telephone unit, connected across the conductors is in an off-hook condition and has thereby reduced the voltage across the conductors, however, an insufficient voltage will be supplied to the gate of the SCR. As a result, the transmission circuitry will not operate, and the telephone call then being made will not be adversely affected.

Several problems are not addressed by prior art devices. For example, it may happen that the polarity of the DC voltage on the telephone conductors is reversed inadvertently when the conductors are connected to the automated telephone communication system. With some prior art systems, this may result in a failure to properly detect off-hook conditions. Additionally, while a transmission to the central computer is taking place, a subscriber may pick up a telephone unit handset and attempt to place a call. This may adversely affect the transmission of data to the central computer and, additionally, it undoubtedly will annoy the subscriber since he will not be able to place his call. It will be appreciated that, in the case of emergencies, it is especially important that a telephone unit remain operative. Further, it may be desirable to be able to detect a ring signal on the telephone conductors.

It is seen, therefore, that there is a need for a dependable monitor circuit for checking the availability of a telephone line prior to the transmission of data over the line, for a monitor circuit which monitors the continued availability of the line during the transmission of data, and for such a monitor circuit which detects a ring signal.

SUMMARY OF THE INVENTION

These needs are met by the present invention which contemplates a method and circuit for detecting a reduction in voltage across a pair of telephone electrical conductors, which conductors supply telephone service to a telephone subscriber, thereby determining when a telephone unit of the subscriber is in an off-hook condition. The circuit includes an amplifier means, connected across the telephone electrical conductors, providing a detection signal related to the voltage across the conductors, and a threshold means which is responsive to the detection signal for providing an alarm indication of an off-hook condition.

The amplifier means may comprise means for providing a detection signal at a potential level which is substantially less than the voltage across the pair of telephone electrical conductors. The threshold means may comprise a first comparator means for receiving the detection signal and providing a first output signal when the detection signal is greater than a first predetermined reference level, the first output signal indicating the absence of an off-hook condition. The threshold means may further comprise a second comparator means for receiving the detection signal and providing a second output signal when the detection signal is less than a second predetermined reference level. The second output signal indicates the absence of an off-hook condition, and the absence of both the first and second output signals indicates an off-hook condition.

According to the present invention, a communication system is connected to a pair of telephone conductors which supply telephone service to a telephone subscriber, and includes switch means connected to one of the pair of telephone conductors, and transformer means having a first winding connected in series between the switch means and the other of the pair of telephone conductors. A modem is connected to a second winding of the transformer means for communicating over the telephone conductors via the transformer means. A voltage sensor means senses the voltage across the telephone conductors and detects a reduction in the voltage level across the conductors, indicating an off-hook condition of a subscriber telephone unit. The switch means is periodically opened so as to disconnect the transformer means from the telephone conductors and to permit the voltage sensor means to check for an off-hook condition. The switch means comprises an optically coupled switch which is periodically switched open to permit the potential across the telephone conductors to rise if an off-hook condition does not exist.

The voltage sensor means may comprise an amplifier means, and a threshold means. The amplifier means is connected across the pair of telephone conductors to provide a detection signal related to the voltage level across the conductors. The threshold means is responsive to the detection signal for providing an alarm indication of an off-hook condition of a telephone unit of the subscriber. The switch means may then be maintained in an open switch state to permit use of the telephone unit. The amplifier means may comprise means for providing a detection signal at a potential level which is substantially less than the voltage across the pair of telephone electrical conductors. The threshold means may comprise a first comparator means for receiving the detection signal and providing a first output signal when the detection signal is greater than a first predetermined reference level, and a second comparator means for receiving the detection signal and providing a second output signal when the detection signal is less than a second predetermined reference level. The absence of both the first and second output signals indicates an off-hook condition.

A method of sharing the use of telephone conductors, which supply telephone service to the telephone units of a subscriber, with a modem comprises the steps of:

(a) connecting a first winding of a transformer across the conductors and connecting the second winding of the transformer to the modem;

(b) initiating communication over the telephone conductors via the modem;

(c) periodically disconnecting the first winding from at least one of the telephone conductors;

(d) monitoring the voltage level across the conductors when the first winding is disconnected from the telephone conductors; and (e) maintaining the first winding electrically disconnected from the telephone conductors when the voltage level across the telephone conductors is less than a predetermined level, whereby the modem does not interfere with operation of a telephone unit then in use.

The step of periodically disconnecting the first winding from at least one of the telephone conductors includes the step of disconnecting the first winding for a period of approximately 0.003 seconds. The step of periodically disconnecting the first winding from at least one of the telephone conductors may further include the step of disconnecting the first winding approximately once every five seconds.

Accordingly, it is an object of the present invention to provide a method and apparatus by which communication over telephone conductors providing service to a subscriber may be effected without interfering with the subscriber's use of one or more telephone units connected to the conductors; to provide such a method and apparatus in which the voltage level across the telephone conductors is checked to determine whether a telephone unit connected to the conductors is in an off-hook condition or whether a ring signal is applied to the conductors; and to provide such an apparatus and method in which a transformer connecting a modem to the telephone conductors is periodically disconnected from the conductors and the voltage across the conductors is then checked to determine whether a telephone unit connected across the conductors is in an off-hook state.

Other objects and advantages of the invention will be apparent from the following description, the accompanying drawings and the appended claims.

DETAILED DESCRIPTION OF THE PREFERRED EMBODIMENT

Figure 1:
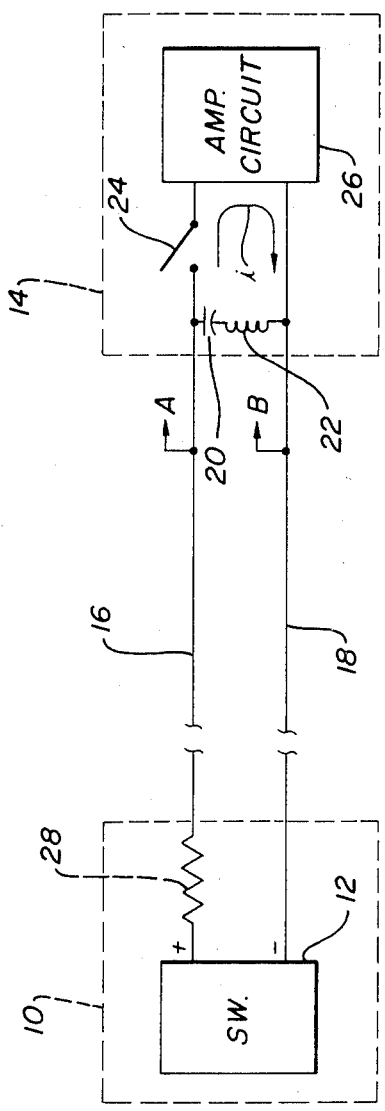
FIG. 1 is a schematic diagram illustrating a telephone unit connected to a pair of electrical conductors providing telephone service to a subscriber.

Reference is made to FIG. 1, which illustrates a telephone circuit diagrammatically. A telephone switching station 10, including switching circuitry 12, provides telephone service to the telephone unit 14 of a subscriber over telephone electrical conductors 16 and 18. Telephone unit 14 includes a capacitor 20 connected in series with the coil 22 of a ringer unit. When the handset (not shown) of the telephone unit 14 is raised, switch 24 is closed, connecting amplifier circuit 26 across conductors 16 and 18. Amplifier circuit 26 provides an interface between the handset and conductors 16 and 18. Although only one subscriber telephone unit 14 is illustrated, it will be appreciated that a number of telephone units may be connected in parallel across conductors 16 and 18.

When the telephone unit 14 is in an on-hook state, that is, when the telephone unit 14 is not in use and switch 24 is open, approximately 50 volts D.C. is provided across conductors 16 and 18 by the switching station 10. When telephone unit 14 is called, the switching circuit 12 causes a 90 volt rms A.C. signal at 20-80 Hertz to be supplied via conductors 16 and 18 to the ringer coil 22, so as to signal the telephone subscriber that a call has been placed to his telephone unit. When the subscriber raises the handset from the telephone unit 14, switch 24 is closed and the input impedance of amplifier 26 is such that a current of approximately 80-180 m.a. flows through conductors 16 and 18. The telephone unit is now in an off-hook state. Due to the resistance associated with the switching circuitry 12, indicated by resistor 28, and the distributed resistance along the telephone conductors 16 and 18, the voltage at the subscriber's location then drops to less than 15 volts D.C. The D.C. voltage will remain at this reduced level during the telephone call, with an A.C. voice signal being superimposed on the D.C. voltage. When the telephone unit 14 is returned to an on-hook condition at the conclusion of the telephone call, the voltage across conductors 16 and 18 at the subscriber's location will again return to approximately 50 volts D.C. The present invention makes use of the voltage drop which occurs across the telephone conductors when a telephone unit goes into an off-hook condition to detect when one or more telephone units are in use.

Figure 2:
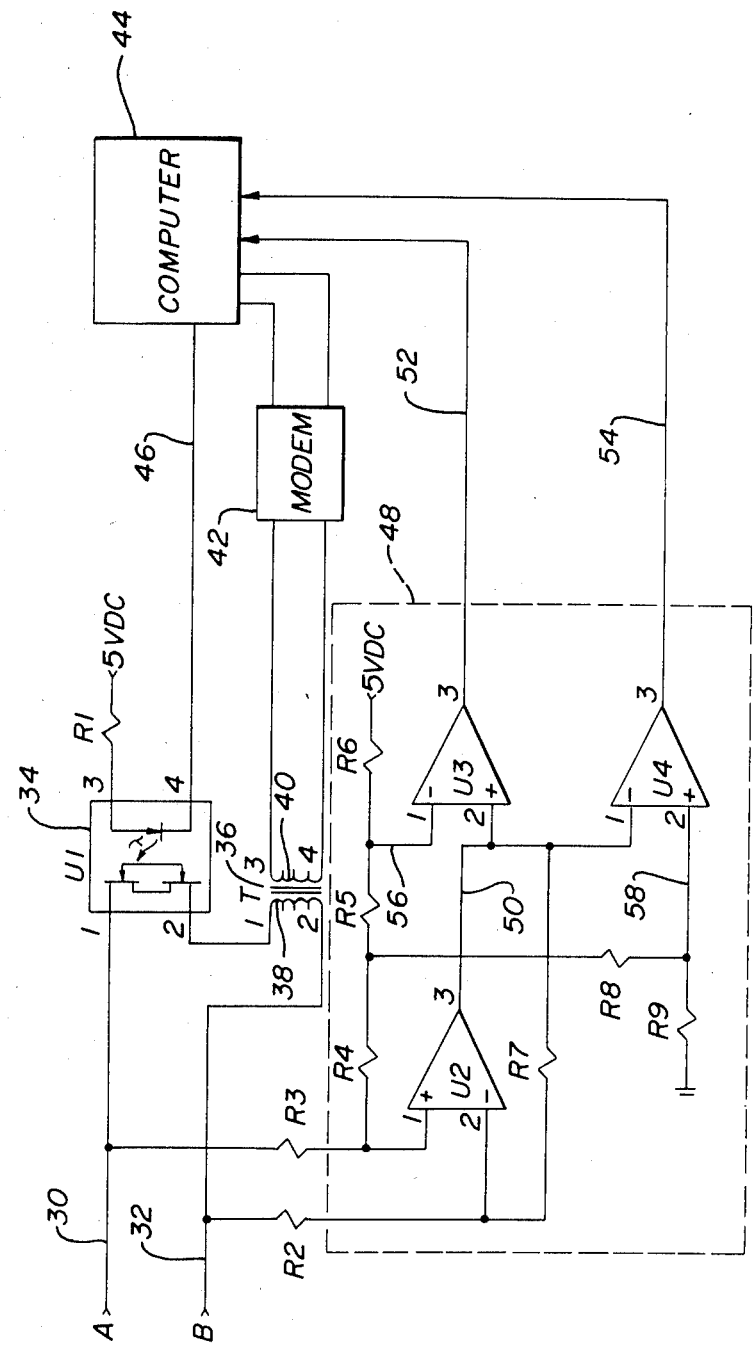
FIG. 2 is an electrical schematic diagram illustrating the circuit of the present invention having inputs A and B which may be connected electrically to nodes A and B, respectively, in FIG. 1.

FIG. 2 is a schematic diagram illustrating a circuit constructed according to the present invention. Circuit inputs A and B are connected across the telephone conductors 16 and 18 at the telephone subscriber's location. Automated telephone communication is effected by this circuit over conductors 30 and 32, through switch means 34 and transformer means 36. The conductors 30 and 32 are connected to a first winding 38 of transformer means 36, and a second winding 40 of the transformer means 36 is connected to modem 42. Computer 44 which, for example, may be any one of a number of known automatic telephone communication systems, gains access to the telephone conductors 16 and 18 by grounding line 46, switching optically coupled switch 34 on, and a connecting conductor 30 to winding 38.

A voltage sensor means, comprising circuit 48, senses the voltage across the telephone conductors 16 and 18, and detects a reduction in the voltage level. As explained above, such a reduced voltage indicates that the subscriber telephone unit 14 is in an off-hook condition. The voltage sensor means checks for an off-hook condition, not only at the initiation of a communication operation but also periodically during such a communication operation.

The circuit 48 has an amplifier means, including operational amplifier U2 and resistors R4 and R7, which is connected across the telephone electrical conductors 16 and 18 via conductors 30 and 32 and resistors R2 and R3. Resistors R2 and R3 are each 15 megohms and resistors R4 and R7 are each one megohm. The amplifier means provides a detection signal on line 50 which is related to the voltage across conductors 16 and 18. Due to the 15:1 ratio between resistor R7 and resistors R2 and R3, the potential on line 50 is 1/15th the potential difference between conductors 30 and 32, offset by a voltage of approximately 2 volts provided by a voltage divider made up of resistors R6, R5, R8, and R9. Resistor R6 is 20 kilohms, while resistors R5, R8 and R9, are each 10 kilohms.

A threshold means, including a first comparator means comprising comparator U3 and a second comparator means comprising comparator U4, is responsive to the detection signal on line 50 and provides an alarm indication on lines 52 and 54 of an off-hook condition of telephone unit 14. The threshold means operates provides a high output on either line 52 or line 54 when an off-hook condition does not exist. Low outputs are provided on both line 52 and line 54 when an off-hook condition does exist. The polarity of the D.C. voltage on lines 16 and 18 determines which of the lines 52 and 54 have a high output in the absence of an off-hook condition.

Comparator U3 receives the detection signal from line 50 and provides an output signal on line 52 when the detection signal is greater than a first predetermined reference level. This first predetermined reference level, approximately 3 volts, is supplied to the comparator U3 on line 56. Comparator U3 thus provides an output on line 52 when the voltage across the telephone conductors 16 and 18 has not dropped sufficiently (i.e., below 15 volts) to indicate an off-hook condition.

If the circuit of FIG. 2 were to be inadvertently installed with conductors 30 and 32 connected to lines 18 and 16, respectively, this polarity reversal would preclude an off-hook condition from being properly detected by comparator U3. In order to ensure that an off-hook condition is detected in such an instance, a second comparator means, including comparator U4, is provided. With a reversal in connection of inputs A and B, the output on line 50 is approximately 0 volts when no off-hook condition exists. When an off-hook condition does exist, however, the output on line 50 is approximately 2 volts due to the voltage offset provided by resistor R4. The comparator U4 provides an output on line 54 when the voltage on line 50 is less than the 1 volt reference supplied to comparator U4 via line 58. It will be apparent, therefore, that either line 52 or line 54 will go high when an off-hook condition does not exist, but that both lines will be low when an off-hook condition exists. Computer 44, through a simple NAND logic combination of the outputs on line 52 and 54 is alerted to the off-hook condition.

A check of the voltage across lines 16 and 18 is accomplished prior to the initiation of automatic data transmission via modem 42 and transformer 36. Assuming that no off-hook condition is detected, line 46 is grounded by computer 44 with the result that switch 34 is closed. A transmission operation may then be initiated. It is important that telephone service to the subscriber not be prevented or interrupted by automatic data transmissions. The telephone subscriber must be able to place calls freely, even during automatic data transmissions, should an emergency telephone call be necessary. In order to accommodate such usage of the subscriber's telephone unit, checks are periodically made to detect if the telephone unit is placed in an off-hook condition.

Computer 44 causes line 46 to go high once every five seconds so as to open switch 34 during a data transmission. If an off-hook condition then exists, the potential across lines 30 and 32 remains low. Should an off-hook condition not exist, however, the potential across lines 30 and 32 will quickly rise to the nominal 50 volt D.C. potential level. The switch 34 is opened for approximately 3 milliseconds, a voltage check is then made by voltage sensor means 48. If an off-hook condition does not exist, switch 34 is immediately closed, and the data transmission permitted to continue via modem 32 and transformer 36. Should an off-hook condition be detected, however, switch 34 will be maintained in an open switching state so as to permit the telephone subscriber to use the telephone unit and place a telephone call. The telephone subscriber must depress the hook switch momentarily to allow the telephone call, previously placed by computer 44, to be terminated. It will be apparent that transformer 36 must be disconnected during these periodic potential measurements since closing switch 34 necessarily produces a current flow through winding 38 of transformer 36, maintaining the potential across lines 30 and 32 at a depressed level and precluding an accurate detection of an off-hook condition. The short sampling interval of approximately 3 milliseconds does not disrupt transmission of data via modem 42, since this is timed to occur during pauses in the transmission operation.

As stated previously, when the telephone unit 14 is in an on-hook condition approximately 50 volts DC is provided across conductors 16 and 18. When the telephone 14 is called, the switching circuit 12 causes a 90 volt rms A.C. ring signal at 20-80 Hertz to be supplied across conductors 16 and 18 and across conductors 30 and 32. The ring signal is processed by circuit 48 and the appropriate signals are provided to the computer 44 via conductors 52 and 54.

In the on-hook state without a ring signal and −50 volts DC across conductors 30 and 32 with conductor 30 referenced to ground, conductor 52 will be a logic "1" (high state) and conductor 54 will be a logic "0" (low state). When the ring signal is supplied across the conductors 30 and 32, the resulting voltage will vary between +77 volts and −177 volts.

When the voltage across conductors 30 and 32 is greater than −15 volts, conductor 52 will be a logic "1" and conductor 54 will be a logic "0". During the time when the voltage across conductors is between −15 and +15 volts, conductors 52 and 54 will each be a logic "0". As the voltage across conductors 30 and 32 exceeds +15 volts, the logic state of conductor 52 remains "0" and conductor 54 changes to a logic "1". This will repeat at a rate of 20-80 times per second as long as the ring signal is present. The operation of the circuit performs in a similar manner when the telephone connections 16 and 18 are reversed. The computer 44 can process this information and determine what action, if any, it must perform. It may be desired, for example, for computer 44 to answer any calls which are made at a specific time of the night so as to receive information from other sources.

Having described the invention in detail and by reference to preferred embodiments thereof, it will be apparent that modifications and variations are possible without departing from the scope of the invention defined in the appended claims.

What is claimed is:

1. A communication system connected to a pair of telephone conductors which supply telephone service to a telephone subscriber, comprising:
    transformer means having a first winding connected to one of said pair of telephone conductors,
    a modem connected to a second winding of said transformer means, for communicating over said telephone via said transformer means,
    voltage sensor means for sensing the voltage across said telephone conductors and detecting a reduction in the voltage level across said conductors, such reduction indicating an off-hook condition of a susbscriber telephone unit, and
    switch means, connected in series between said first winding and the other of said pair of telephone conductors, for connecting said transformer means to said pair of telephone conductors and for periodically disconnecting said transformer means from said telephone conductors during operation of said modem thereby permitting said voltage sensor means to check for an off-hook condition.

2. The communication system of claim 1 in which said switch means comprises an optically coupled switch which is periodically switched open to permit the potential across said telephone conductors to rise if an off-hook condition of a telephone unit connected across said conductors does not exist.

3. The communication system of claim 1 in which said voltage sensor means comprises:
    amplifier means, connected across said pair of telephone conductors, to provide a detection signal related to the voltage level across the conductors, and
    threshold means, responsive to said detection signal, for providing an alarm indication of an off-hook condition of a telephone unit of the subscriber, such that said switch means may then be maintained in an open switching state to permit use of the telephone unit.

4. The communication system of claim 3 in which said amplifier means comprises means for providing a detection signal at a potential level which is substantially less than the voltage across the pair of telephone electrical conductors.

5. The communication system of claim 3 in which said threshold means comprises:
    a first comparator means for receiving said detection signal and providing a first output signal when said detection signal is greater than a first predetermined reference level, said first output signal indicating the absence of an off-hook condition, and
    second comparator means for receiving said detection signal and providing a second output signal when said detection signal is less than a second predetermined reference level, said second output signal indicating the absence of an off-hook condition, and the absence of both said first and second output signals indicating an off-hook condition.

6. A method of sharing the use of telephone conductors which supply telephone service to the telephone units of a subscriber with a modem, comprising the steps of:
    connecting a first winding of a transformer across said conductors and connecting the second winding of the transformer to a modem,
    instituting communication over the telephone conductors via the modem,
    periodically disconnecting said first winding from at least one of said telephone conductors, during said communication,
    monitoring the voltage level across said conductors when said first winding is disconnected from said telephone conductors, and
    maintaining said first winding electrically disconnected from said telephone conductors when the voltage level across said telephone conductors is less than a predetermined level, whereby said modem does not interfere with operation of a telephone unit then in use.

7. The method of claim 6 in which the step of periodically disconnecting said first winding from at least one of said telephone conductors includes the step of disconnecting said first winding for a period of approximately 0.003 seconds.

8. The method of claim 7 in which the step of periodically disconnecting said first winding from at least one of said telephone conductors further includes the step of disconnecting said first winding approximately every five seconds.

9. The method of claim 6 in which the step of monitoring the voltage level includes the step of detecting fluctation in the voltage level at a predetermined frequency, indicating the presence of a ring signal on said conductors.

* * * * *